United States Patent Office 3,583,948
Patented June 8, 1971

3,583,948
PAPER SIZING RESIN
Friedrich Blechinger, Lameystrasse 3,
Mannheim, Germany
No Drawing. Filed Apr. 15, 1968, Ser. No. 721,216
Claims priority, application Germany, Apr. 18, 1967,
E 33,814
Int. Cl. C08g 20/38
U.S. Cl. 260—78                                       8 Claims

ABSTRACT OF THE DISCLOSURE

Sized paper having high ink resistance is prepared from paper stock in which a new resin is dispersed. The resin is obtained from a Diels-Alder reaction product of dipentene or other terpene hydrocarbon with maleic anhydride, which is further reacted with ammonia and thereafter with diethylenetriamine to produce an imide-amine, the latter being made dispersible in water by reaction with epichlorohydrin, all reactions being carried out in the absence of a solvent at temperatures high enough to make the reaction mixtures liquid.

---

This invention relates to cationic sizing agents for paper. Many attempts have been made to prepare sizing agents for paper which are effective in neutral or alkaline paper stock and thus permit the production of paper mainly consisting of cellulose, yet being neutral and permanent. The polymeric materials proposed heretofore for this purpose are either unsatisfactory in their ability of improving the ink resistance of paper, or they are economically unattractive because of the high cost of the necessary starting materials or of the procedure required for their preparation.

The object of the invention is the provision of paper which is highly resistant to ink and permanent even when made of paper stock entirely made up of inexpensive cellulose fibers. Another object is the provision of a resin suitable for being incorporated in such paper by dispersing the resin in the paper stock and separating water from the stock while the same is supported on a foraminous carrier in a conventional manner.

With these and other objects in view, as will hereinafter become apparent, the invention, in one of its aspects resides in a method of making a paper sizing resin in which the anhydride of an α,β-unsaturated dicarboxylic acid, such as maleic acid, is reacted with an excess of a terpene hydrocarbon until the anhydride is substantially completely consumed in a Diels-Alder reaction.

The reaction product is further reacted with ammonia and a polyalkylenepolyamine until the polyalkyleneamine is substantially completely consumed, and an imide-amine is formed. The latter is reacted with enough of an epihalohydrin, such as epichlorohydrin, to make the reaction product dispersible in hot water.

The several reactions are performed in the absence of solvents at temperatures sufficiently high to keep the reaction mixtures liquid.

The reaction of terpene hydrocarbons with maleic anhydride has long been known (Hultzsch, Ang. Chemie 51 (1938) 920; see also "Naturharze-Terpentinoel-Talloel" by Sandermann, page 296), and all the known terpene hydrocarbons are suitable starting materials for the process of the invention.

Ammonia is preferably provided for the purpose of this invention by the thermal decomposition of ammonium acetate which takes place at temperatures at which the ammonia liberated is capable of rapid reaction with the product of the Diels-Alder reaction. The preferred polyalkylenepolyamine is diethylenetriamine.

The resins of the invention are readily dispersed in hot water to form concentrated stock emulsions containing as much as 25% resin. The stock emulsions are diluted and added to paper stock in the usual manner, approximately 1 to 5 percent resin being employed, based on the air dry fibers in the paper stock as is conventional. The resins of the invention may be used in paper stock which is neutral or slightly alkaline, and thus permit relatively permanent paper to be produced even from sulphite stock.

The terpene hydrocarbons which are the principal starting material of this invention, and the reactants additionally employed are inexpensive industrial chemicals. All reactions are performed in fused media without the use of solvents which are costly in themselves and must be removed at some stage of resin production. The resins thus are inexpensive, yet they are surprisingly superior in improving the ink resistance of paper to fortified rosin sizes.

The following example is further illustrative of this invention:

EXAMPLE I

Dipentene (DL-limonene) was freshly distilled, saturated with water, and filtered through dry filter paper. A flask equipped with a stirrer, thermometer, condenser, and funnel was charged with 75.0 g. (about 0.55 mole) of the dipentene and 1.5 g. concentrated phosphoric acid. The mixture was held at about 140° C. for approximately 30 to 60 minutes to isomerize the dipentene, and was then permitted to cool somewhat.

44.0 g. (approximately 0.44 mole) maleic anhydride were added to the liquid in the flask, and a Diels-Alder reaction was carried out by keeping the reaction mixture at 180° to 190° C. until the maleic anhydride was completely consumed by the excess of isomerized dipentene (3 to 4 hours).

The reaction mixture was permitted to cool to approximately 140° C., and 17.0 g. (0.22 mole) ammonium acetate powder were added. When the temperature was raised slowly to 180° C. to decompose the ammonium acetate, unreacted dipentene, acetic acid, and water were discharged through the condenser. The last traces of the volatile materials were removed by passing nitrogen through the melt in the flask.

The imide or amide formed as an adduct from the ammonia liberated by the decomposed ammonium acetate and the product of the Diels-Alder reaction was cooled to about 100° C., and the flask was transferred to a water bath kept at 80° to 90° C. At this temperature, 18.5 g. (0.18 mole) 98% diethylenetriamine were added drop by drop to the contents of the flask which were kept at 100° C. until the diethylenetriamine had been consumed, as determined by the practically complete disappearance of the characteristic odor.

Ultimately, 25 g. (0.3 mole) epichlorohydrin were added drop by drop while the temperature was carefully maintained below 110° C. The mixture was then stirred 30 minutes at 120° C., was poured from the flask, and permitted to solidify.

A pale, somewhat brittle resin was obtained. It was readily emulsified in hot water, and stock emulsions containing approximately 25% resin were stable for several months if they were prepared with sufficiently vigorous agitation to finely disperse the resin.

A portion of a stock emulsion was diluted with water and added to an aqueous slurry of bleached cellulose fibers produced by the sulfite process in an amount of 2 parts of resin per 100 parts of air dry cellulose. The slurry had a pH of 7–8. Hand-made sheets having a weight of 100 g./m.² were pressed and dried at ambient temperature and thereafter on a laboratory drum drier at 70° and 120° C. Strips of the freshly dried sheets were subjected to an ink flotation test. The ink did not soak through to the top surface within 30 minutes, whereupon the test was interrupted in most cases. It was continued to 60 minutes with a few strips without ink penetration. Comparison strips were prepared in an otherwise identical manner with a conventional fortified rosin sizing (Pexol, Hercules Powder Co.) in an amount of 2% using alum as a precipitant. The comparison strips showed penetration of ink within 20 minutes.

When the paper making process was modified by adding sodium hydroxide to the paper stock containing the resin of the invention to pH 9, the ink flotation test was still negative after 30 minutes.

EXAMPLE II

A Diels-Adler addition product was formed by isomerizing 136 g. (1 mol) turpentine by stirring same with 1.36 g. concentrated phosphoric acid at about 150° C. for approximately one half hour. Then 98 g. (1 mol) maleic anhydride were added and the reaction mass kept at 180 to 190° C. for 5 hours. Surplus anhydride condensed on the cooler parts of the flask.

To 117 g. of this reaction product were added 19.25 g. (0.25 mol with reference to the originally applied anhydride) ammonium acetate at 140° C., the mass was heated to about 190° C. whereby unreacted oil, remaining free anhydride, acetic acid and water distilled off. The remainder of volatile substances was removed by blowing nitrogen through the liquid.

The flask was transferred to a water bath and 21.5 g. (0.21 mol with reference to originally applied anhydride) diethylenetriamine were added dropwise at 100 to 120° C. The temperature was then kept at 80 to 100° C. for an hour. Still present unreacted ammonia was removed by blowing nitrogen through the liquid.

Then 30 to 36 g. (0.35 to 0.39 mol with reference to the originally applied anhydride) epichlorohydrin were added dropwise at 100 to 120° C. After addition care must be taken to prevent gelation of the liquid.

The resulting resin was similar in physical aspects to the dipentene product and likewise easily dispersible in hot water. The ink resisting properties of the water-dispersed resin when mixed to a slurry of cellulosic fibers were the same as stated above.

Other terpene hydrocarbons which may be substituted for dipentene or turpentine in equimolecular amounts without major changes in the result include alpha-terpinene, menthadiene, etc.; see also British Pat. No. 633,332.

Maleic anhydride is preferred because of its ready availability, but may be replaced by anhydrides of other alpha, beta- unsaturated dicarboxylic acids such as alkyl- or aryl-substituted maleic anhydride.

Gaseous ammonia may be substituted for ammonium acetate, and diethylenetriamine may be replaced by any polyalkylenepolyamine such as triethylenetetramine, tetraethylenepentamine or the corresponding propylene compounds in such a way that about one half of the anhydride groups present are reacted with the same, i.e. for 1 mol of anhydride approximately one half mol of polyalkylenepolyamine be used. About the other half of the anhydride groups is reacted with ammonia.

While epihalohydrins other than epichlorohydrin are hardly practical under present conditions, epibromohydrin and epi-iodohydrin are fully effective when substituted for epichlorohydrin in the above procedure in equimolecular amounts.

What is claimed is:
1. A method of preparing a paper sizing resin which comprises:
   (a) reacting the anhydride of an $\alpha,\beta$-unsaturated dicarboxylic acid with an excess of a terpene hydrocarbon until said anhydride is substantially completely consumed in a Diels-Alder reaction;
   (b) reacting the product of said Diels-Alder reaction with ammonia and a polyalkylenepolyamine in a combined amount of approximately one mole equivalent of ammonia and polyalkylene-polyamine per mole of said anhydride until said polyalkylene-polyamine is substantially consumed, and an imide-amine is formed; and
   (c) reacting said imide-amine with enough of an epihalohydrin to make the reaction product dispersible in hot water,
      (1) said reactions being performed in the absence of solvents at temperatures at which the reaction mixtures are liquid.

2. A method as set forth in claim 1, wherein said anhydride is maleic anhydride.

3. A method as set forth in claim 1, wherein said product of the Diels-Alder reaction is reacted with ammonia by mixing said product with ammonium acetate, and keeping the mixture at a temperature high enough to decompose said ammonium acetate to ammonia and acetic acid and volatilize the acetic acid.

4. A method as set forth in claim 1, wherein said epihalohydrin is epichlorohydrin.

5. A method as set forth in claim 4, wherein said anhydride is maleic anhydride, said product of the Diels-Alder reaction is reacted with ammonia by mixing said product with ammonium acetate, and keeping the resulting mixture at a temperature high enough to decompose said ammonium acetate to ammonia and acetic acid and volatilize said acetic acid, and said polyalkylenepolyamine is diethylenetriamine.

6. A method as set forth in claim 5, wherein said terpene hydrocarbon is dipentene.

7. A method as set forth in claim 1, wherein said polyalkylenepolyamine is diethylenetriamine.

8. A resin capable of being dispersed in hot water and essentially consisting of the polymeric product prepared by the method of claim 1.

References Cited

UNITED STATES PATENTS

| 3,043,789 | 7/1962 | Cyba | 260—78 |
| 3,125,552 | 3/1964 | Loshaek et al. | 260—78 |
| 3,239,491 | 3/1966 | Tsou et al. | 260—78 |
| 3,291,679 | 12/1966 | O'Brien | 260—78 |

HAROLD D. ANDERSON, Primary Examiner

U.S. Cl. X.R.

162—164; 260—9, 29.2